(No Model.) 2 Sheets—Sheet 1.
J. C. H. STUT.
AUTOMATIC TENSION DEVICE FOR CABLE RAILWAYS.
No. 424,833. Patented Apr. 1, 1890.
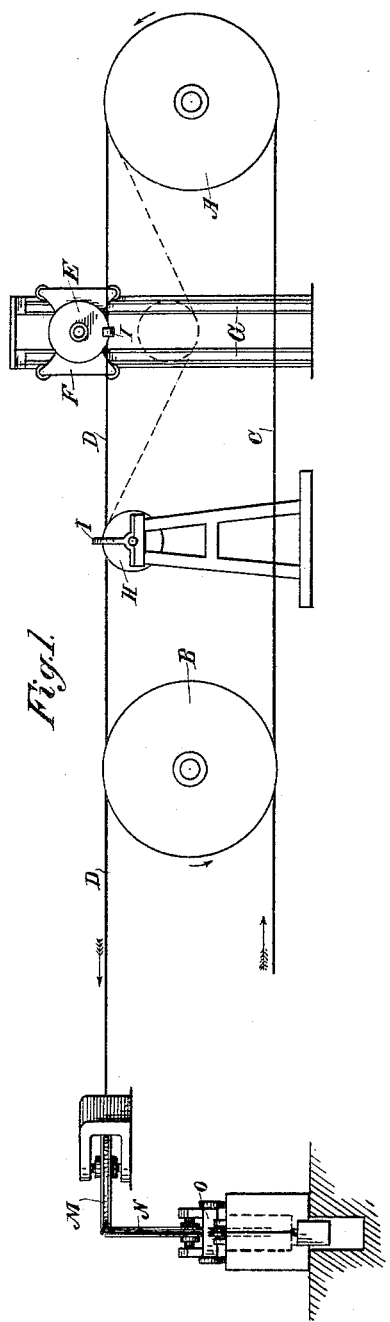
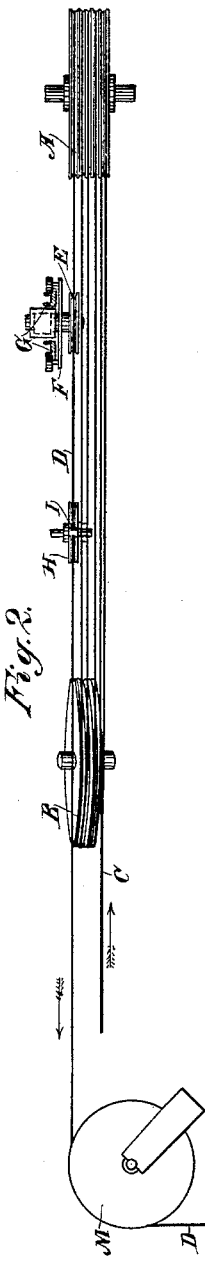
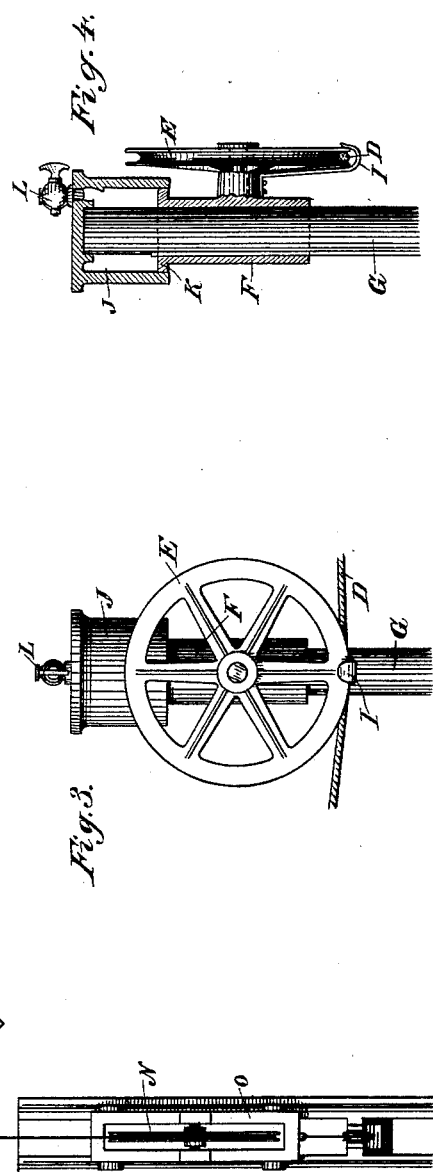
Witnesses,
Geo. H. Strong
Inventor,
John C. H. Stut
By Dewey & Co.
Attys (No Model.) 2 Sheets—Sheet 2.

J. C. H. STUT.
AUTOMATIC TENSION DEVICE FOR CABLE RAILWAYS.

No. 424,833. Patented Apr. 1, 1890.

Witnesses,
Geo. H. Strong.

Inventor,
John C. H. Stut.
By Dewey & Co.
Atty.

UNITED STATES PATENT OFFICE.

JOHN CH. H. STUT, OF SAN FRANCISCO, CALIFORNIA.

AUTOMATIC TENSION DEVICE FOR CABLE RAILWAYS.

SPECIFICATION forming part of Letters Patent No. 424,833, dated April 1, 1890.

Application filed January 14, 1890. Serial No. 336,934. (No model.)

*To all whom it may concern:*

Be it known that I, JOHN CH. H. STUT, a citizen of the United States, residing in the city and county of San Francisco, State of California, have invented an Improvement in Automatic Tension Devices for Cable Railways; and I hereby declare the following to be a full, clear, and exact description of the same.

My invention relates, generally, to cable railways, and especially to a device which I term an "automatic tension apparatus for the cables of cable railways."

It consists of sheaves or pulleys journaled in frames and traveling or sliding upon vertical guides, so as to rest upon the cable, the weight of the sheaves causing it to press upon the cables where they leave the driver, and thus take up any sudden temporary or unusual slack which may occur.

Figure 5:
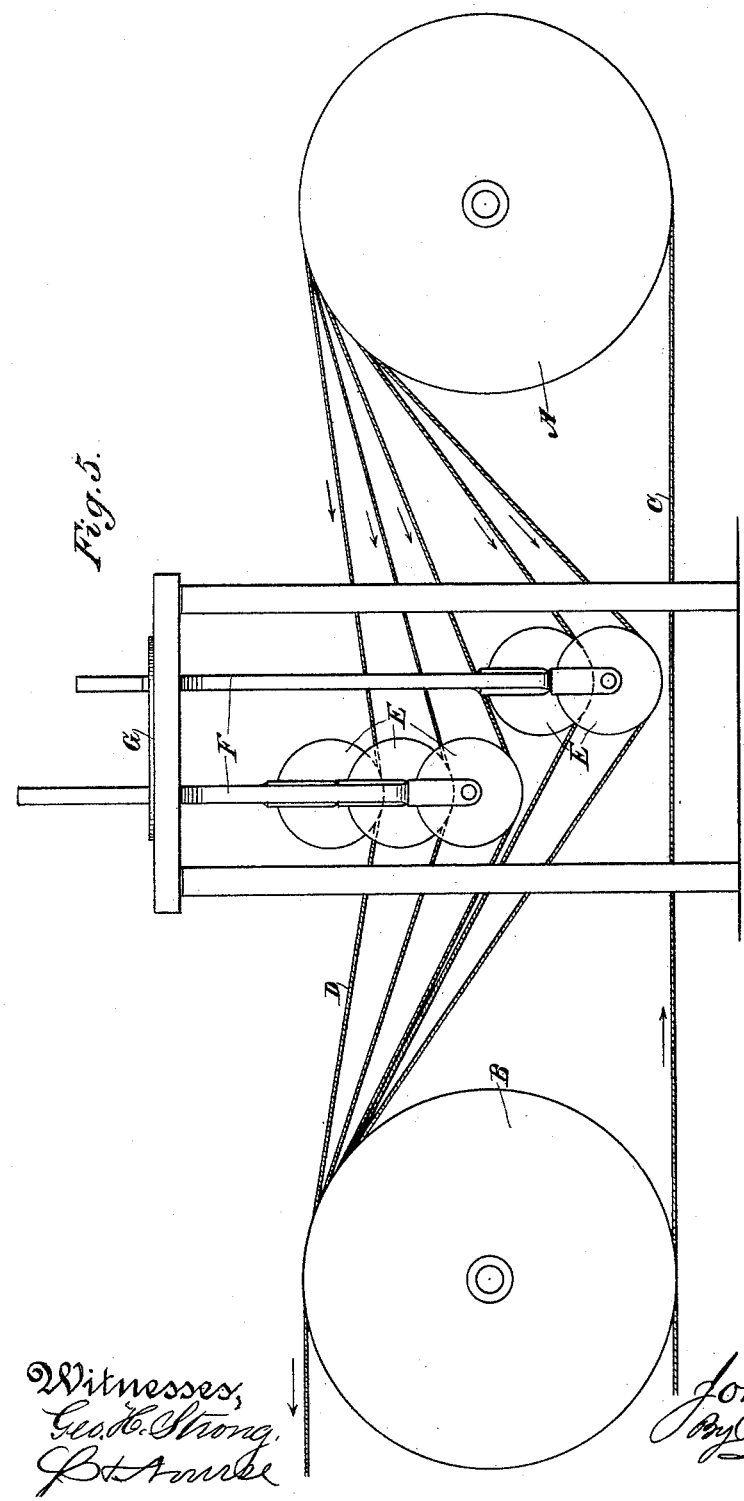
Figure 6:
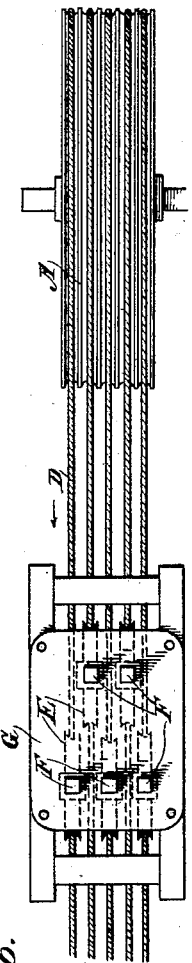

Referring to the accompanying drawings for a more complete explanation of my invention, Figure 1 is a side elevation showing the driving and following sheaves and cable and my improved device in connection therewith. Fig. 2 is a plan view showing the incoming and outgoing cables, the driving and following sheaves, and the tension-regulator. Figs. 3 and 4 are enlarged front and side elevations, respectively, of the tension apparatus. Fig. 5 is a side elevation showing several tension-sheaves bearing upon the cables intermediate between a driving-sheave and follower. Fig. 6 is a plan view of the same.

This invention is designed to be employed in connection with the driving apparatus of an endless cable employed for cable roads, and is especially applicable to the driving-gear for cables known as the "windlass" type, although it may be used in connection with other systems.

In the present case I have shown my invention as applied to a driving-gear similar to that for which I have filed application for Letters Patent November 15, 1889, Serial No. 330,454, and my present invention is designed to automatically regulate changes in the length of the cable, such as often occur in long lines of cable, where the addition or removal of a number of cars tends to change the tension suddenly and temporarily.

This device is independent of any mechanism for permanently taking up the stretch of the cable, but may be used in conjunction therewith.

In the plan of driving the cable which I have here shown, A is the driving-sheave, and B the follower.

C represents the incoming and D the outgoing cable. The incoming cable passes first over the driving-sheave, thence back around the follower, then to the driving-sheave again, and so on until it has passed around three, four, five, or more turns, as may be considered necessary, and thence the cable passes from the driving-sheave out into the tube or tunnel under the roadway, either directly or around intermediate direction-sheaves, as the nature of the ground and position of the machinery may necessitate.

All permanent elongations or changes in length of the cable are taken up by moving the follower-sheave backward, as is described in my former application for a patent, or by other suitable take-up devices; but sudden changes in length, which occur, as before described, by reason of the change of load upon the cable, will often cause the latter to jump out of the supporting-sheaves in the power-house and along the line of the road-bed, and in order to provide some device for automatically adjusting this irregular tension, which device shall act quickly enough to adjust it at once, I have shown the pulley or sheave E, journaled upon a sliding frame F. This frame is adapted to travel upon vertical guides G, which are placed, preferably, at a point near and behind the driving-sheave, so that the sheave or pulley E may rest upon the outgoing cable at the point near where it leaves the driving-sheave. This is preferable, because the tension upon the cable is least at this point, and the tension-sheave and its frame having considerable weight (which may be increased, as may be desired, by the addition of supplemental weights) will rest upon the cable, and when the latter becomes slack either from sudden elongation resulting from the attaching or detaching of a number of cars or from other causes the sheave, being guided vertically, will press upon the cable and immediately take up such slack as may be thus produced, and if the cable becomes very slack the sheave will descend to a considerable distance and carry the cable with it, not only taking up the slack, but thereby causing the cable to pass around more of the circumference of the driving-sheave, with a corresponding increase in the frictional surface or wrap for driving purposes. It will be manifest that the action of this vertical sheave is much more rapid than that of any form of tension apparatus in which the cable has to travel over one or more sheaves before being acted upon by the tension, because in my device the sheave rests directly upon the cable after it leaves the driver, and is thus very sensitive to any change in tension.

H is a sheave journaled upon the frame between the driver and the follower-sheaves, over which the outgoing cable is guided, and the tension-sheave rests upon the outgoing cable between the driver and this stationary sheave. The object of this is to have a constant length of the cable upon which the tension-sheave rests, and any change which may be made in the position of the follower in gradually taking up permanent elongations of the cable will not affect this bearing-sheave or the tension device.

In some cases it may be found desirable to employ more than one of these tension-sheaves, in which case I have shown a frame, Figs. 5 and 6, having guides for as many sheaves as there are cables passing between the driver and follower, including the outgoing cable. These sheaves are arranged with relation to the cables so that one sheave rests upon each of the cables, and a sufficient weight being connected with each sheave each one may be depended upon to take up a certain portion of the slack, instead of having it all taken up by one, as in the first instance. This also equalizes the strains on the different cables between the driver and follower sheave to a certain extent. In the ordinary way of driving the cable the strain diminishes from the incoming to the outgoing turn of the cable around the driving-sheave, whereas in this case it is equalized somewhat. This tension device may, as before stated, be used either alone or in connection with other tension devices, one of which I have shown in my present drawings, in which case the cable after leaving my tension apparatus passes around a guiding sheave or pulley M, thence around a tension sheave or pulley N, which is mounted upon a truck O, and from this pulley the cable is again led to its proper destination in the tube or tunnel beneath the street. A weight is attached to the truck O, which carries the tension pulley, in this case a weight hanging in a pit sufficiently deep so that it will draw the truck back whenever any considerable amount of slack takes place in the cable, and when the tension is again brought upon the cable the truck will be gradually drawn forward. This device, however, cannot be depended upon to take up sudden slacks in the cable such as take place when the grip of a car is made to seize the cable near where the outgoing cable comes from the driving-sheave and where the sudden strain of starting the car will cause a considerable slack between the car and the driving-sheave. If the cable passes around a number of pulleys before it comes to the tension-carriage, as described in the tension mechanism N O, the device will not act with sufficient rapidity on account of friction on its journals and track to take up and give out this slack, but the vertically-moving sheaves which I have described as my present invention will instantly take up this slack and will give it out again when necessary. The apparatus, however, which is shown at M, N, and O is intended to take up the greater amount of slack which often occurs where a great number of cars take hold of the cable at or about the same time, in which case there will sometimes be a slack of as much as twenty or twenty-five feet, depending upon the length of the cable. This condition of the cable is necessary to be maintained for the proper operation of the cable, since if it were kept in too tight a condition the strain upon the cable would be too great, and it would be ruined in a very short space of time.

In order to prevent the cable from leaving the groove of the tension-pulleys E, I have shown a guard I, which is suitably fixed to the sliding sleeve or frame which carries the pulley. This guard extends outward toward the bottom of the pulley and is curved over the groove or opening, so that in case of any sudden movement or jump which the pulley might make upon the cable, resulting from sudden tightening of the same, the latter will not be thrown out of the groove. A similar guard may be placed over the direction-pulley H for the same purpose.

It will be manifest that the pulleys E may be guided in various ways in their rising and falling motion. In the present case I have shown the guide G in the form of a vertical column, upon which the sliding frame or sleeve F is adapted to travel, the column being polygonal in shape, so that the sleeve and pulley will not turn out of their proper position. The column might be made round and provided with a feather as a guide for the sleeve of the bearing for the sheave, as shown. The upper end of the column has fixed to it a cylindrical portion, forming an air dash-pot J, and the upper end of the movable sleeve has an enlarged head or plunger K, which fits within this dash-pot, and if the parts should be thrown up suddenly by the strain upon the cable this dash-pot would serve as a cushion to the sudden movement.

L is an air-cock by which the pressure within the dash-pot may be regulated. It will be manifest that in place of the dash-pot with the air-cushion I may employ a spiral or rubber spring.

Having thus described my invention, what I claim as new, and desire to secure by Letters Patent, is—

1. The combination, with cable and the driving-sheave and follower, of an intermediate tension device consisting of a sheave journaled in a loosely-mounted non-pivotal frame traveling on vertical guides, so as to rest upon the outgoing cable at a point near the driving-sheave, substantially as herein described.

2. A tension device consisting of the sheave or pulley resting upon the outgoing cable near the driver, a sleeve upon the side of which said pulley is journaled, a vertical column upon which the sleeve moves freely, and a spring or air-cushion at the upper end of the column, whereby a sudden upward movement of the sleeve and pulley is arrested and cushioned, substantially as herein described.

3. A tension device consisting of a sheave journaled upon a frame traveling upon a vertical guide, said sheave resting upon the outgoing cable between the driver and follower sheave, and a guard fixed to the moving frame to which the pulley is journaled and extending beneath the periphery of the pulley, so as to retain the cable in its place, substantially as herein described.

4. A railway-cable tension device consisting of a pulley resting upon the outgoing cable where it leaves the driving apparatus and a guide upon which the pulley has a vertical motion, in combination with a stationary vertically-journaled sheave over which the outgoing cable passes and between which and the driving-sheave the tension-sheave rests upon the cable, substantially as herein described.

5. The vertical guide-post having the air chamber or dash-pot upon the upper end, a sleeve sliding upon the post and having a head fitting the open end of the dash-pot, and a grooved pulley journaled upon a horizontal shaft fixed to the sleeve and resting upon the outgoing cable near the driving mechanism, substantially as herein described.

In witness whereof I have hereunto set my hand.

JOHN CH. H. STUT.

Witnesses:
S. H. NOURSE,
H. C. LEE.